(12) United States Patent
Uphaus (10) Patent No.: US 6,749,039 B1
(45) Date of Patent: Jun. 15, 2004

(54) GO-KART ASSEMBLY (76) Inventor: Ric Uphaus, Rte. 1, Box 42, Brundidge, AL (US) 36010

( * ) Notice: Subject to any disclaimer, the term of this patent is extended or adjusted under 35 U.S.C. 154(b) by 235 days.

(21) Appl. No.: 10/055,160

(22) Filed: Oct. 26, 2001

(51) Int. Cl.[7] .................. B60K 17/28; B60K 17/00; B60K 26/02; B62D 21/12

(52) U.S. Cl. .................. 180/357; 180/208; 180/370; 180/333; 180/908; 180/291; 280/785; 280/756; 188/2 D; 188/68

(58) Field of Search .................. 280/785, 756, 280/DIG. 5; 180/208, 217, 350, 351, 357, 370, 373, 333, 908, 291, 292; 188/2 D, 68

(56) References Cited

U.S. PATENT DOCUMENTS

| | | | | |
|---|---|---|---|---|
| 1,632,940 A | * | 6/1927 | Wright | 477/201 |
| 3,022,846 A | * | 2/1962 | Thompson | 180/11 |
| 3,829,117 A | * | 8/1974 | Park | 180/291 |
| 4,273,211 A | * | 6/1981 | Sarmiento | 180/333 |
| 4,682,668 A | * | 7/1987 | Salmon et al. | 180/209 |
| 4,896,899 A | * | 1/1990 | Lawrence | 280/775 |
| 5,246,403 A | * | 9/1993 | Uphaus | 474/83 |
| 5,401,056 A | * | 3/1995 | Eastman | 280/785 |
| 5,597,048 A | * | 1/1997 | Brister et al. | 180/292 |
| 5,931,524 A | * | 8/1999 | Jones, Jr. | 296/177 |
| 6,022,049 A | | 2/2000 | Wiggins, Jr. | |
| 6,026,923 A | | 2/2000 | Uphaus | |
| 6,039,335 A | * | 3/2000 | Sheridan | 280/124.103 |
| 6,056,080 A | | 5/2000 | Clavel | |
| 6,155,940 A | * | 12/2000 | Templeton | 474/13 |
| 6,170,596 B1 | * | 1/2001 | Triarsi et al. | 180/291 |
| 6,349,786 B1 | * | 2/2002 | Gift | 180/271 |
| 2002/0011374 A1 | * | 1/2002 | Brister | 180/291 |

FOREIGN PATENT DOCUMENTS

GB  2 306 140 A  *  4/1997

* cited by examiner

*Primary Examiner*—Ruth Ilan
(74) *Attorney, Agent, or Firm*—Smith, Gambrell & Russell (57) ABSTRACT

A modular go-kart assembly includes an acceleration assembly cooperatively working with a braking assembly for powering and stopping the go-kart assembly. The go-kart assembly further includes a central body, a front drive assembly, a rear drive assembly, and a protective cage assembly, each of which are modular for easy construction and disassembly. The go-kart assembly includes a motor having multiple power take off shafts to provide simple connections to an acceleration assembly and a braking assembly. Both the acceleration assembly and the braking assembly are controlled by one control pedal, so as to provide a safety measure for the operator, which is typically a child.

18 Claims, 14 Drawing Sheets

GO-KART ASSEMBLY

FIELD OF THE INVENTION

The present invention relates to the field of miniature vehicles and more particularly to the field of vehicles designed for use by children. More particularly, the present invention relates to a modular go-kart assembly that is easily assembled and that includes an improved power source for operating the go-kart assembly. Even more particularly, the present invention relates to a modular go-kart assembly that can be disassembled to store in a minimal amount of space, and that includes an improved braking system for the secure operation of the go-kart assembly.

BACKGROUND OF THE INVENTION

Children's vehicles, or go-karts as they are sometimes called, are well known in the art. Such internal combustion vehicles are presumably called "go-karts" in recognition of the ability of the vehicles to traverse the ground at an apparent high rate of speed relative to the proximity to the ground. Accordingly, go-karts may not be suitable for very young drivers such as preschoolers. One form of vehicle for very young drivers is the battery operated toy car, although the battery frequently requires recharging and is cumbersome to recharge and to transport. Therefore, the toy is often left sitting in an unused state for long periods of time, or is quickly disposed of by parents who become frustrated by the charging cycle of the battery or the low tolerance of such vehicles for outdoor terrain.

The design of conventional go-karts typically provides the go-kart with a substantially rigid frame such that the wheels on either side are fixed in relation to each other. Therefore it is quite difficult to store or convey go-karts due to bulkiness and rigidity of the design. In particular, the size of such go-karts does not permit the transfer through traditional shipping companies, such as Federal Express™ or UPS™, and therefore increases the difficulty for sending purchased items.

What is desired, then, and not found in the prior art, is an improved go-kart, assembly that is modular for storage and packaging purposes and that also includes an improved powering assembly to improve the operation of the go-kart assembly at lower speeds and to further provide a braking assembly for controlling the speed of operation.

SUMMARY OF THE INVENTION

An object of the present invention is to provide a go-kart having an improved power supply.

A further object of the present invention is to provide a go-kart design that has operational safety features.

A further object of the present is to provide a go-kart design having an improved braking system.

A further object of the present invention is to provide a go-kart assembly that has a protective frame that is easily assembled and disassembled by the user.

An additional object of the present invention is to provide a go-kart assembly that has a protective frame that, when disassembled, can be stored within a predetermined confined space for distribution purposes.

Yet another object of the present invention is to provide a go-kart assembly that is sturdy and secure to transport of children.

These and other objects and advantages of the invention will become apparent from the following detailed description of the preferred embodiment of the invention. An improved go-kart assembly is provided that is modular for easy storage, and that further includes a compact and improved means for powering the go-kart assembly. The go-kart assembly includes a go-kart frame, a front drive assembly, a rear drive assembly and a protective cage assembly, each of which are modular for easy construction and disassembly. The go-kart frame is welded together front to rear. The wheels are assembled, the steering wheel is assembled, the seat back with integral hairguard is assembled as well as the protective cage.

Moreover, the go-kart assembly includes a motor having multiple power take off shafts to provide simple connections to an acceleration assembly and a braking assembly. Both the acceleration assembly and the braking assembly are controlled by one control pedal, so as to provide a safety measure for the operator, which is typically a child.

BRIEF DESCRIPTION OF THE DRAWINGS

An improved go-kart assembly embodying the features of the present invention is depicted in the accompanying drawings which form a portion of this disclosure and wherein.

DESCRIPTION OF THE PREFERRED EMBODIMENTS

Referring to the figures for a better understanding of the invention, it will be appreciated that the present invention comprises a combination of novel elements to provide an improved go-kart assembly 10. More specifically, looking at FIGS. 1 through 8, the go-kart assembly 10 of the present invention is one that is easily assembled and that has an improved method for controlling the movement of the go-kart assembly 10. Looking specifically to FIGS. 1 and 7, the go-kart assembly 10 generally comprises a body 12, a front drive assembly 30, a rear drive assembly 50, and a protective cage assembly 90.

Figure 1:
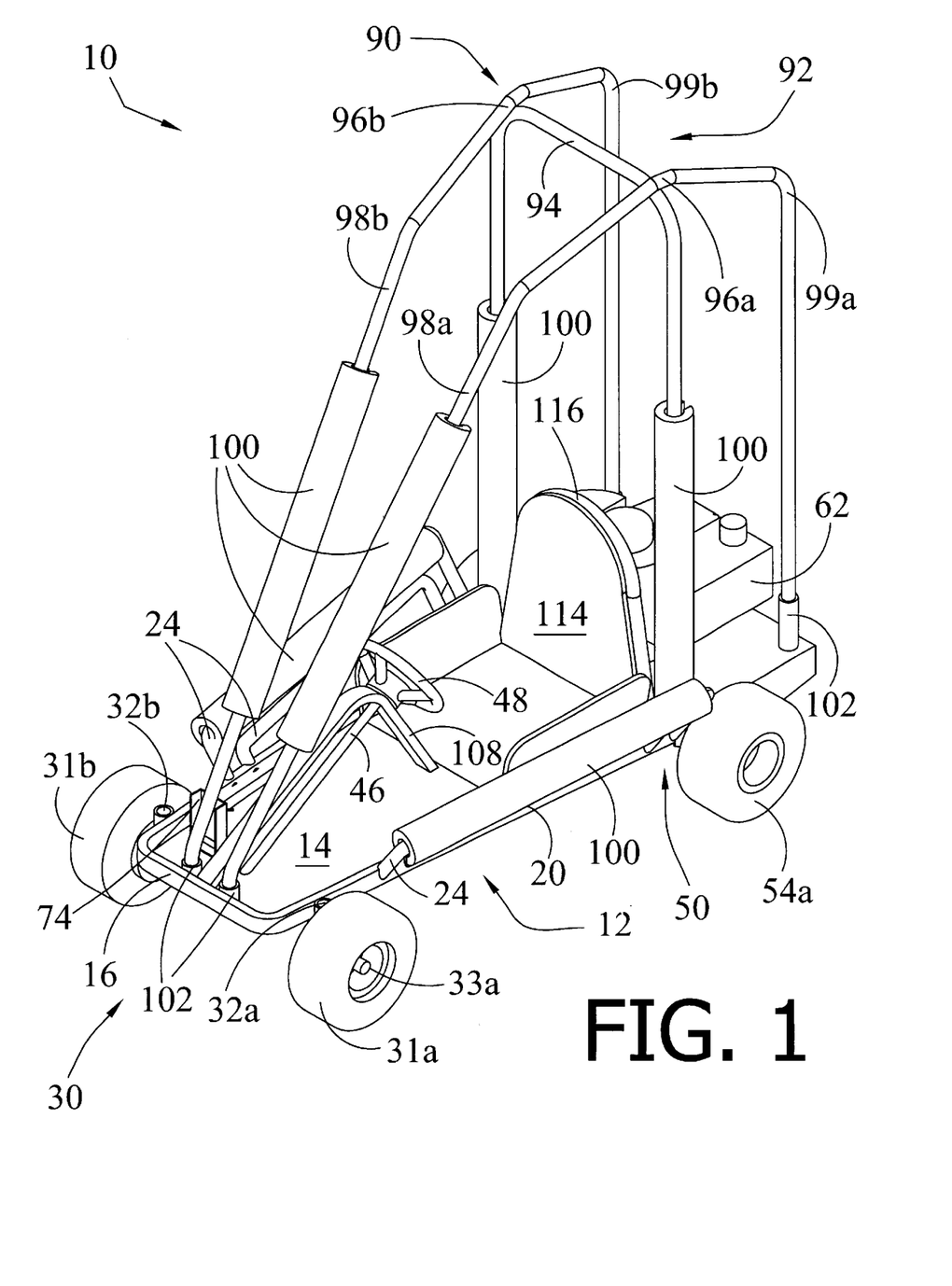
FIG. 1 is a front perspective view of the improved go-kart assembly of the present invention.
Figure 9:
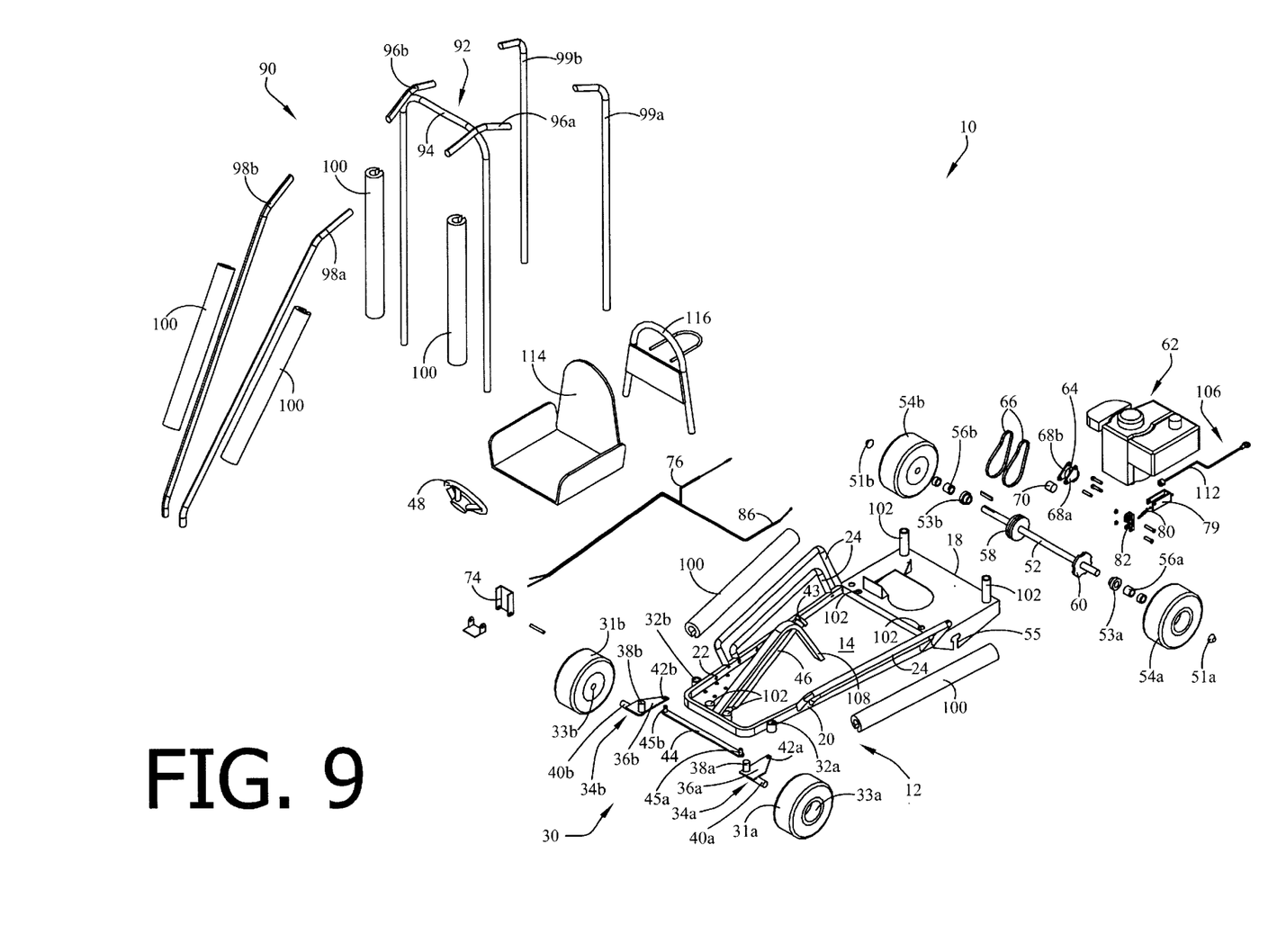
FIG. 9 is an exploded view of the go-kart assembly of the present invention.

Looking now to FIGS. 1 and 9, the body 12 includes a substantially rectangular or trapezoidal base section 14 having a front edge 16 and a rear edge 18, with the front and rear edges 16, 18 being joined by a first edge 20 and an opposing second edge 22. The front drive assembly 30 is also attached proximate the front edge 16 of the base section 14, and the rear drive assembly 50 is attached proximate the rear edge 18 of the base section 14. A protective cage assembly 90 is attached to the uppermost surface of the body 12, and is operable to shield and protect the operator (typically a juvenile) of the go-kart assembly 10 during operation of the go-kart assembly 10. At least one safety gripping bar 24 is attached to both the first and second edges 20, 22 of the base section 14, with the preferred embodiment shown in FIG. 1 having two safety gripping bars 24 attached to both the first and second edges 20, 22 of the base section 14.

Figure 2:
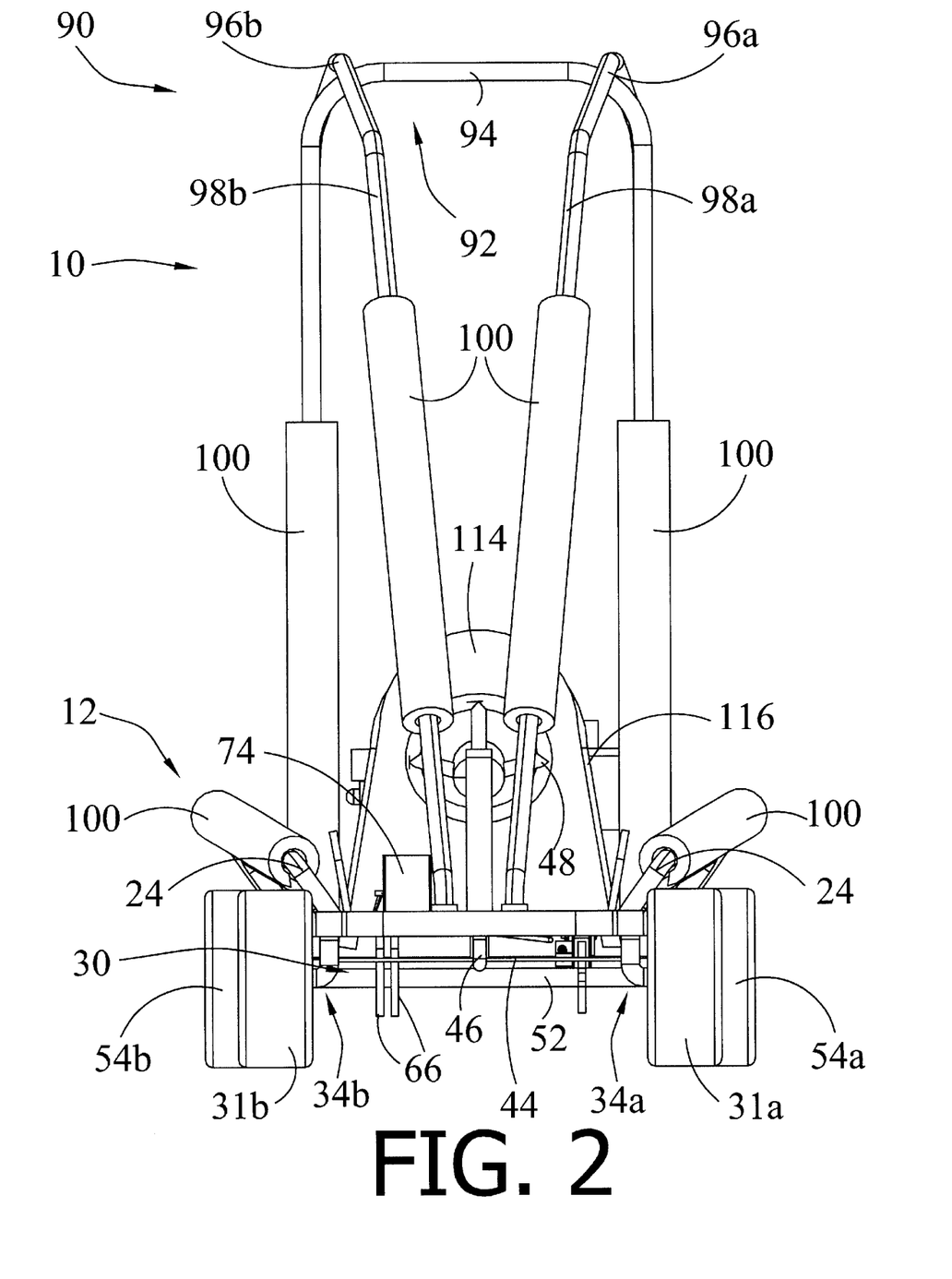
FIG. 2 is a front side view of the improved go-kart assembly of the present invention.
Figure 3:
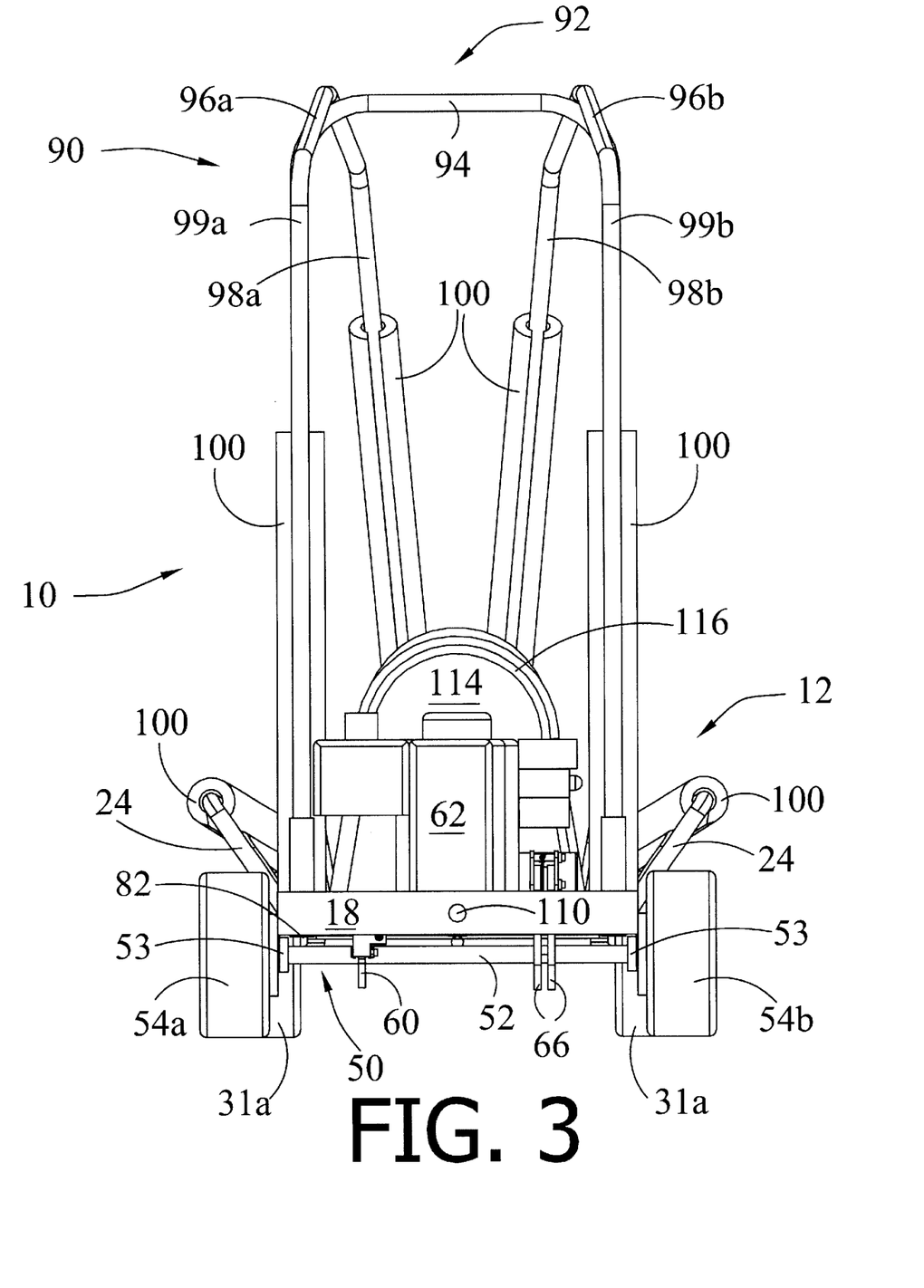
FIG. 3 is a rear side view of the improved go-kart assembly of the present invention.
Figure 4:
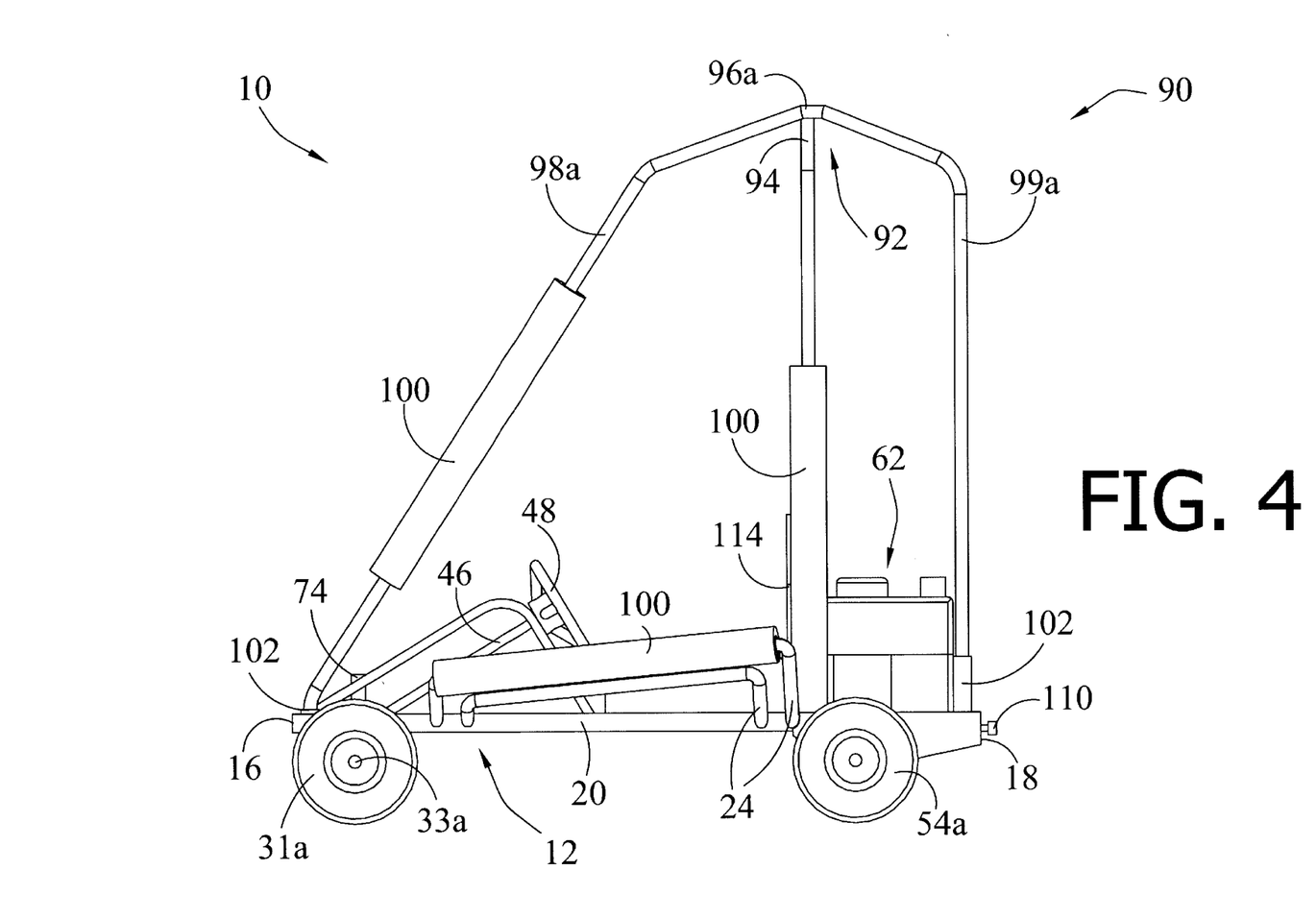
FIG. 4 is a left side view of the improved go-kart assembly of the present invention.

Looking to FIGS. 1, 2, and 9, the front drive assembly 30 includes first and second steerable wheels 31a, 31b that are connected respectively to first and second spindle members 34a, 34b. The spindle members 34a, 34b are further pivotally connected to a pair of vertical sleeves 32a, 32b that are affixed to the body 12 on the first and second edges 20, 22, preferably near the front edge 16. Looking specifically to FIG. 9, each spindle member 34a, 34b includes a spindle plate 36a, 36b, with a spindle rod 38a, 38b perpendicularly attached to the face of the respective spindle plate 36a, 36b for rotatably engaging the one vertical sleeve 32a or 32b. Each spindle member 34a, 34b additionally includes a steerable wheel shaft 40a, 40b mounted to the spindle plate 36a, 36b, with the steerable wheel shaft 40a, 40b being positioned parallel to the face of the spindle plate 36a, 36b. Each steerable wheel shaft 40a, 40b engages the respective steerable wheel 31a, 31b via a wheel bearing 33a, 33b such that the steerable wheels 31a, 31b are freely rotatable about the steerable wheel shafts 40a, 40b. Finally, each spindle plate 36a, 36b additionally includes a respective spindle aperture 42a, 42b.

Viewing FIG. 9, a tie rod 44 and steering column 46 are included in the front drive assembly 30, with the tie rod 44 having two L-shaped ends 45a, 45b. The L-shaped ends 45a, 45b of the tie rod 44 operate to traverse and engage the spindle apertures 42a, 42b such that the tie rod 44 will direct the rotating movement of the steerable wheels 31a, 31b. Referring to FIGS. 1 and 9, the steering column 46 is included in the front drive assembly 30, with the steering column 46 having a first end that is sustained by support arm 108 and connected to a steering wheel 48 via the mounting plate 43 and a second end that is connected to the tie rod 44. Consequently, rotation of the steering wheel 48 by the operator also rotates the steering column 46, which in turn moves the tie rod 44 in a lateral direction. As a result, the steerable wheels 31a, 31b will be pivoted according to the direction of movement desired by the operator of the go-kart assembly 10.

Looking now to FIGS. 1, 3, 7, and 9, the rear drive assembly 50 includes a rear axle 52 that is coupled to the body 12 with a pair of axle bearings 53a, 53b. In the preferred embodiment, a pair of large keyholes 55 traverse a portion of the body 12. Consequently, the axle bearings 53a, 53b may be slid into the large keyholes 55 with the outer diameter of the axle bearings 53a, 53b being a predetermined size to lock the axle bearings 53a, 53b in the keyholes 55. In addition, it should be noted that each axle bearing 53a, 53b is a conventional ball bearing with an outer snap ring. The rear axle 52 traverses each axle bearing 53a, 53b so that the rear wheels 54a, 54b may be propelled. In the preferred embodiment, one of the rear wheels 54a or 54b is driven while the other rear wheel 54a or 54b is free to spin with the driven wheel. The pair of rear wheels 54a, 54b are thereby connected to the ends of the rear axle 52, with the rear wheels 54a, 54b being connected on opposing ends of the rear axle 52. A pair of wheel spacers 56a, 56b are then affixed to the rear axle 52 to steady the position of the driven wheels 54a, 54b and a pair of push retainers 51a, 51b are used to prevent the undesired displacement of driven wheels 54a, 54b from the rear axle 52.

Figure 7:
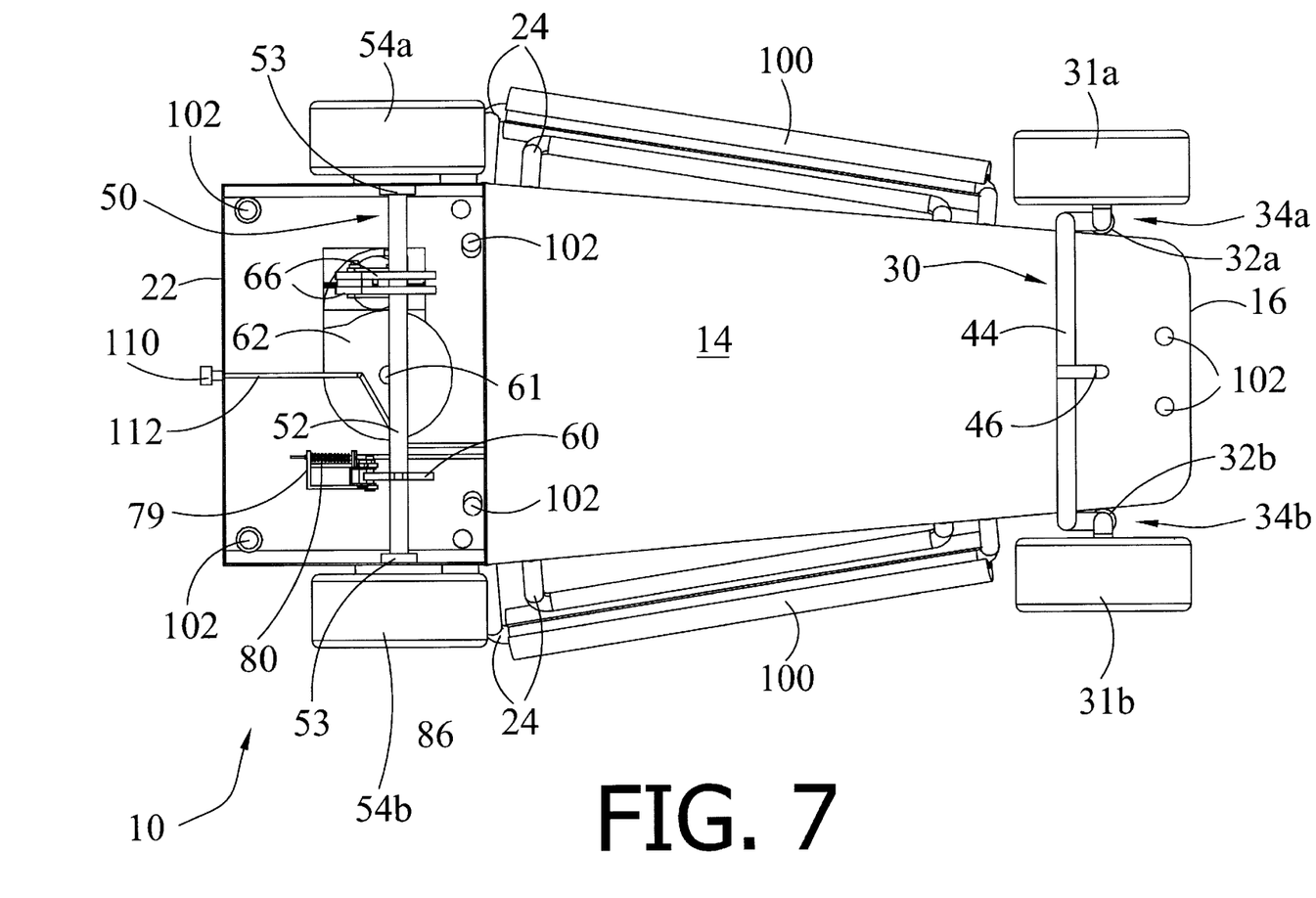
FIG. 7 is a bottom view of the improved go-kart assembly of the present invention.
Figure 8:
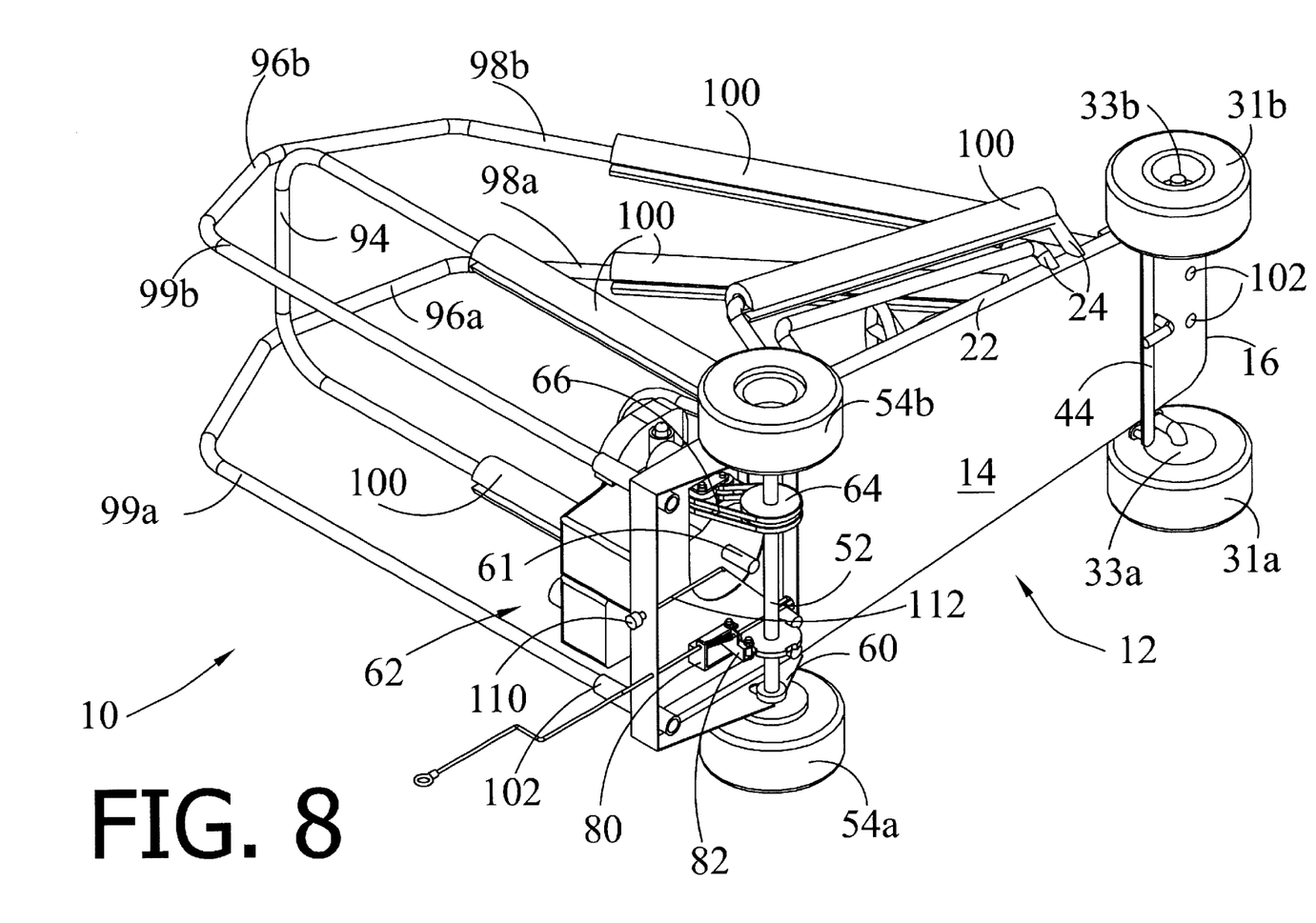
FIG. 8 is a bottom perspective view of the go-kart assembly of the present invention.

An axle pulley 58 is additionally attached to the rear axle 52 of the rear drive its assembly 50 to control the rotation of the rear axle 52. A brake hub 60, preferably having either a toothed or slotted outer perimeter, is also connected to the rear axle 52, preferably at a predetermined distance from the axle pulley 58. The brake hub 60 aids in stopping the rotation of the rear axle 52 through prevention of rotation of the rear axle 52.

Figure 10:
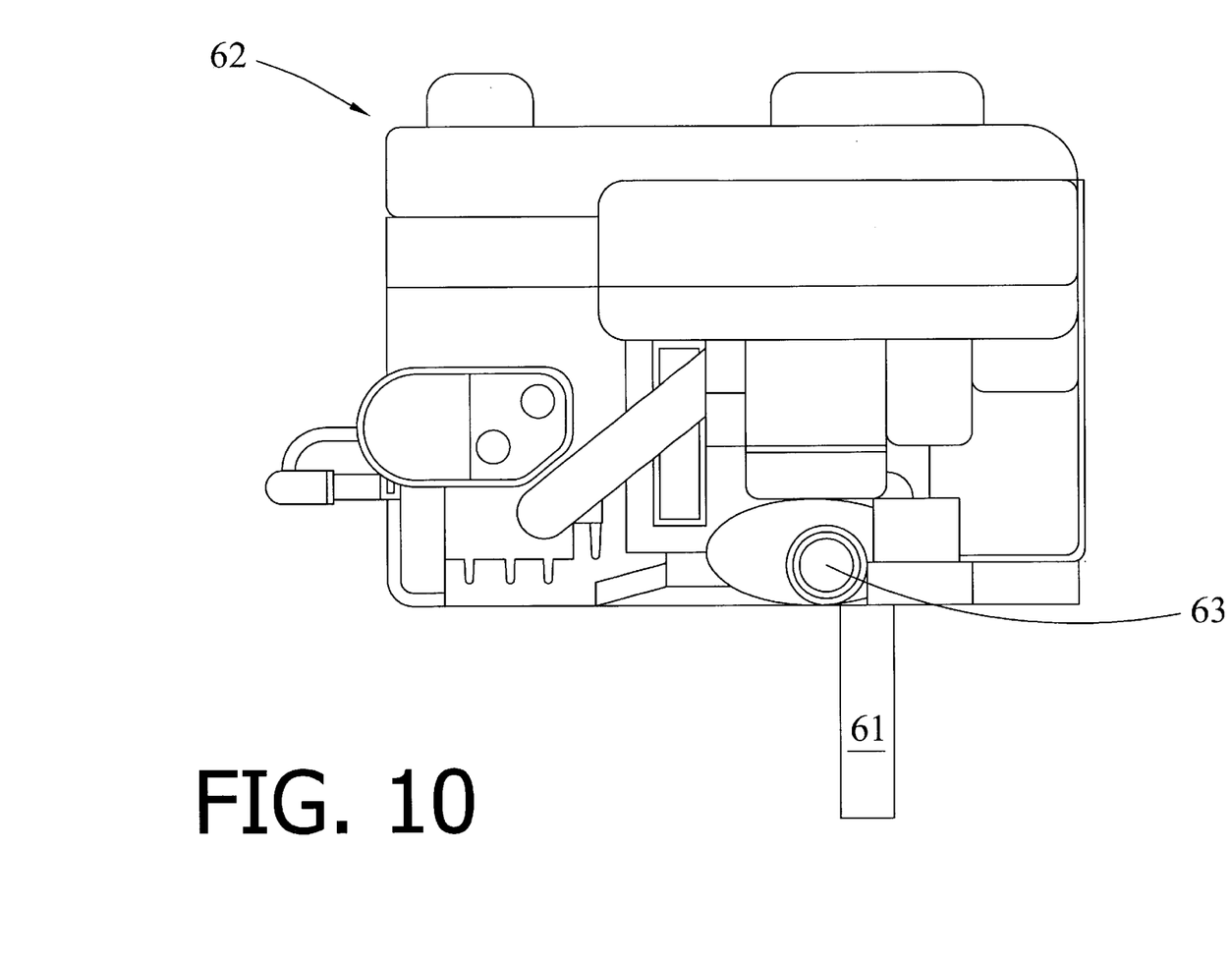
FIG. 10 is a side view of the motor used with the go-kart assembly of the present invention.

Referring to the bottom view provided in FIG. 7, the go-kart assembly 10 additionally includes a motor 62, which is mounted to the body 12 proximate to the rear edge 22 of the base section 14. In the preferred embodiment illustrated in FIG. 10, the motor 62 is a vertical engine having approximately 3.5 horsepower as desired to power the go-kart assembly 10. The motor 62 additionally has two power take off shafts: a primary PTO shaft 61 and a auxiliary PTO shaft 63. The primary PTO shaft 61 is a conventional motor crankshaft, while the auxiliary PTO shaft 63 is a substantially horizontally oriented shaft that is preferably mechanically connected to the primary PTO shaft 61, such that primary PTO shaft 61 will generate rotation of the auxiliary PTO shaft 63. However, it is possible that the auxiliary PTO shaft 63 could be connected to another driving means, such as a cam shaft gear (not illustrated). A drive pulley 64 is connected to the auxiliary PTO shaft 63, such that the auxiliary PTO shaft 63 controls the rotation of the drive pulley 64, as discussed in more detail herein.

Continuing to view FIGS. 7 and 9, the motor 62 is mechanically connected to the rear axle 52 of the rear drive assembly 50 via a pair of drive belts 66 that engage a portion of the outer perimeter of the axle pulley 58 and drive pulley 64. The tension of the drive belts 66 on the respective axle pulley 58 and drive pulley 64 will determine the operation of the go-kart assembly 10, and this tension is controlled by an idler roller 70. When the idler roller 70 applies pressure to the drive belts 66, the drive belts 66 will tightly engage both the axle pulley 58 and the drive pulley 64. Such an engagement allows the rotation of the drive pulley 64 to generate a corresponding rotation by the axle pulley 58, and thus the rear axle 52. In contrast, when the idler roller 70 does not engage the drive belts 66, the drive belts 66 will be loosely positioned around the axle pulley 58 and the drive pulleys 64. When the drive belts 66 are loose, there will be little, if any, energy transferred from the drive pulley 64 to the axle pulley 58 via the drive belts 66 so that there is no driven rotation of the rear axle 52.

Figure 11A:
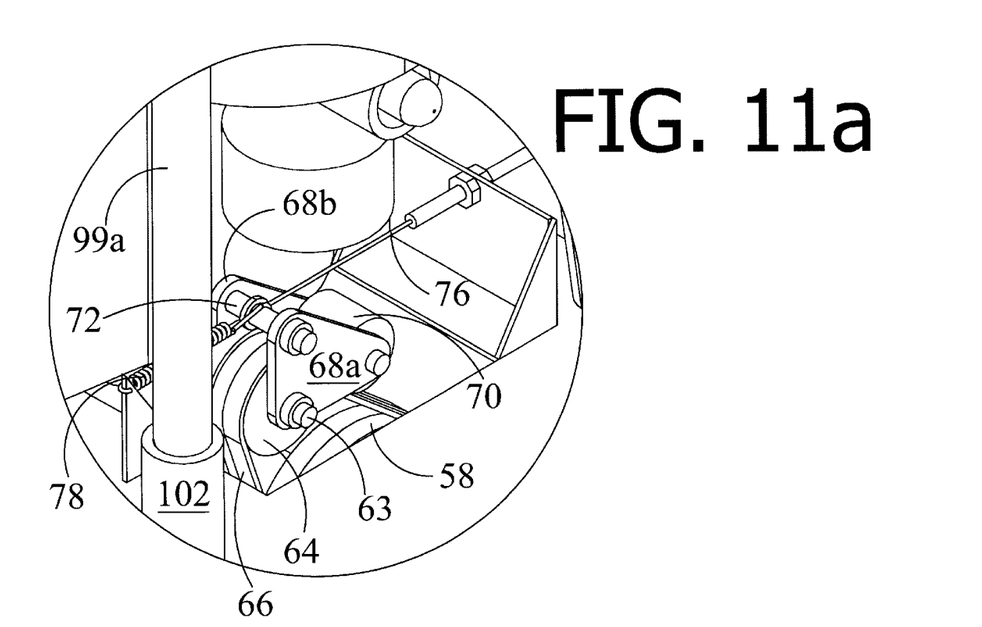
FIG. 11a is an enlarged view of a portion of the acceleration assembly of the go-kart assembly of the present invention.

Referring now to FIGS. 9 and 11a, the drive pulley 64 is mounted on the auxiliary PTO shaft 63 and positioned between inner and outer pivot plates 68a, 68b. In the preferred embodiment, the inner and outer pivot plates 68a, 68b are substantially triangular in shape, with the drive pulley 64 mounted on the auxiliary PTO shaft 63 in one corner between the pivot plates 68a, 68b, the idler roller 70 mounted in a second corner, and a pivot pin 72 mounted in a third corner. The drive belts 66 are positioned between the idler roller 70 and the drive pulley 64, and the pivot plates 68a, 68b are pivotable about the auxiliary PTO shaft 63 such that the idler roller 70 may be pivoted between an extended position making contact with the drive belts 66 and a retracted position wherein the idler roller 70 makes no contact with the drive belts 66.

Looking at FIGS. 1, 9, 11a, 12, and 13, the arced movement of the pivot plates 68a, 68b is governed by an acceleration assembly that includes the axle pulley 58, the drive pulley 64, and the drive belts 66 discussed above, as well as a control member or control pedal 74, a drive control line 76, and a belt tensioner spring 78. The belt tensioner spring 78 is connected between the pivot pin 72 between pivot plates 68a, 68b and the body 12. The belt tensioner spring 78 is preferably an extension spring, such that the tendency of the belt tensioner spring 78 will be to draw the idler roller 70 away from the drive belts 66. One end of the drive control line 76 is additionally connected to the pivot pin 72, with the opposing end of the drive control line 76 being affixed to the control pedal 74. As a result, when the control pedal 74 is pressed by the operator, the drive control line 76 will also be pulled in the same direction, such that the pivot pin 72 will be drawn in a direction against the force applied by the belt tensioner spring 78. Consequently, the idler roller 70 will thereby contact the drive belts 66 and provide tension between the drive belts 66 and the first and second pulleys 58, 64. The mechanical energy provided by the rotation of the auxiliary PTO shaft 63 and the drive pulley 64 will be transferred to the axle pulley 58 and the rear axle 52. The rear axle 52 will then power the driven wheels 54a, 54b and consequently propel the go-kart assembly 10.

Figure 11B:
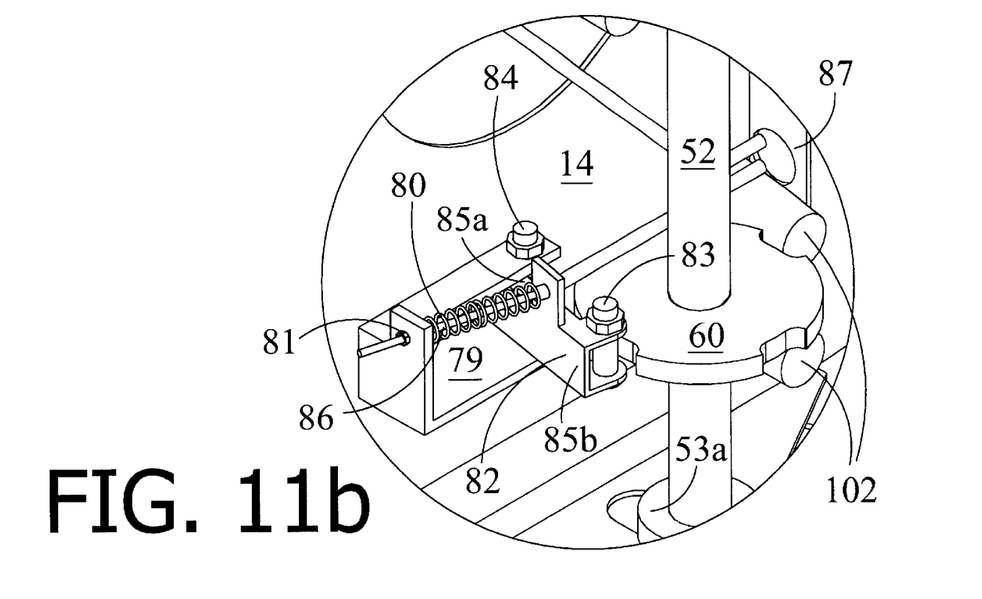
FIG. 11b is an enlarged bottom view of a portion of the braking assembly of the go-kart assembly of the present invention.
Figure 11C:
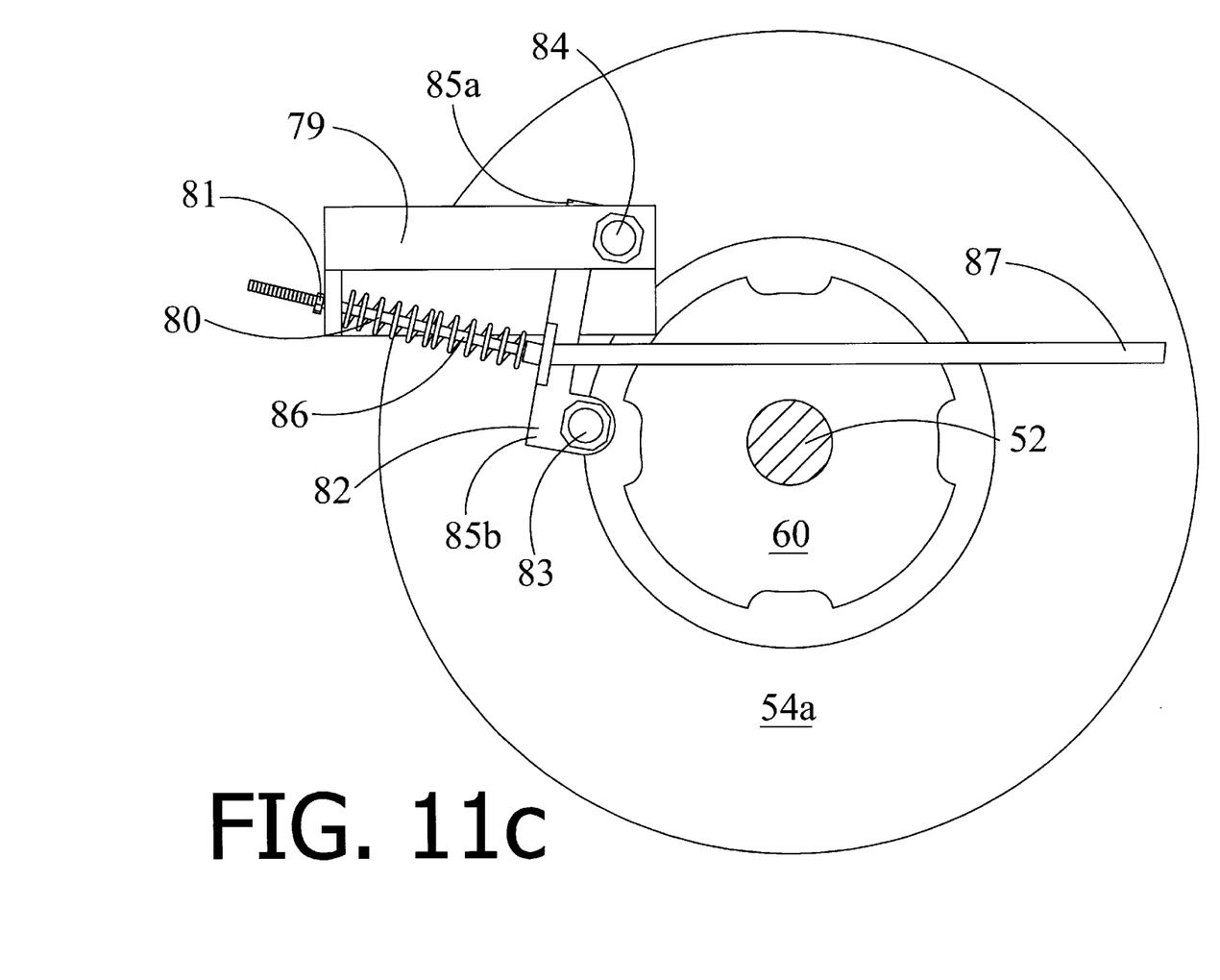
FIG. 11c is a sectional view of a portion of the braking assembly of the go-kart assembly of the present invention as illustrated in FIG. 11b.
Figure 12:
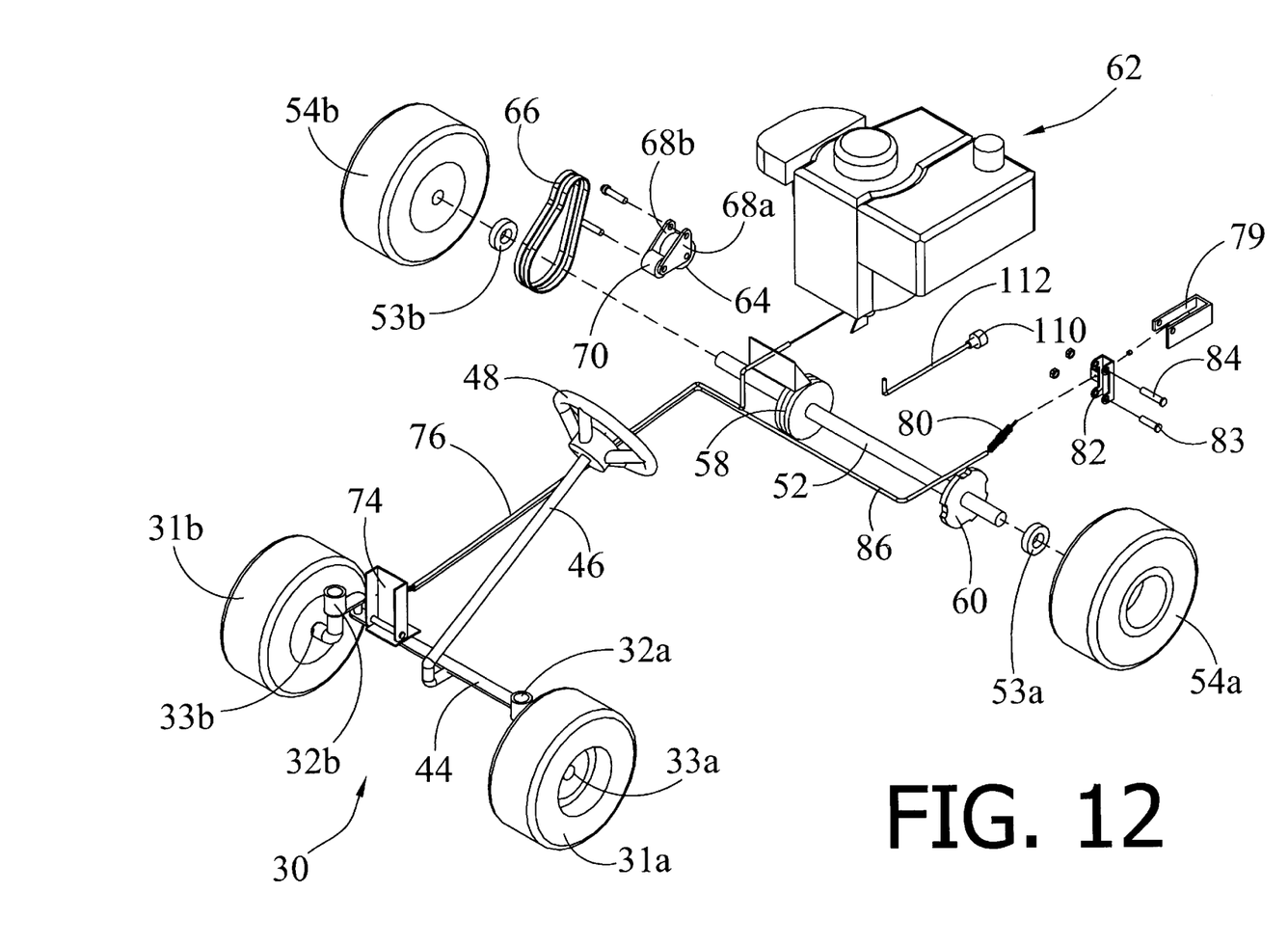
FIG. 12 is a forward perspective view of a portion of the acceleration and braking assemblies of the go-kart assembly of the present invention.
Figure 13:
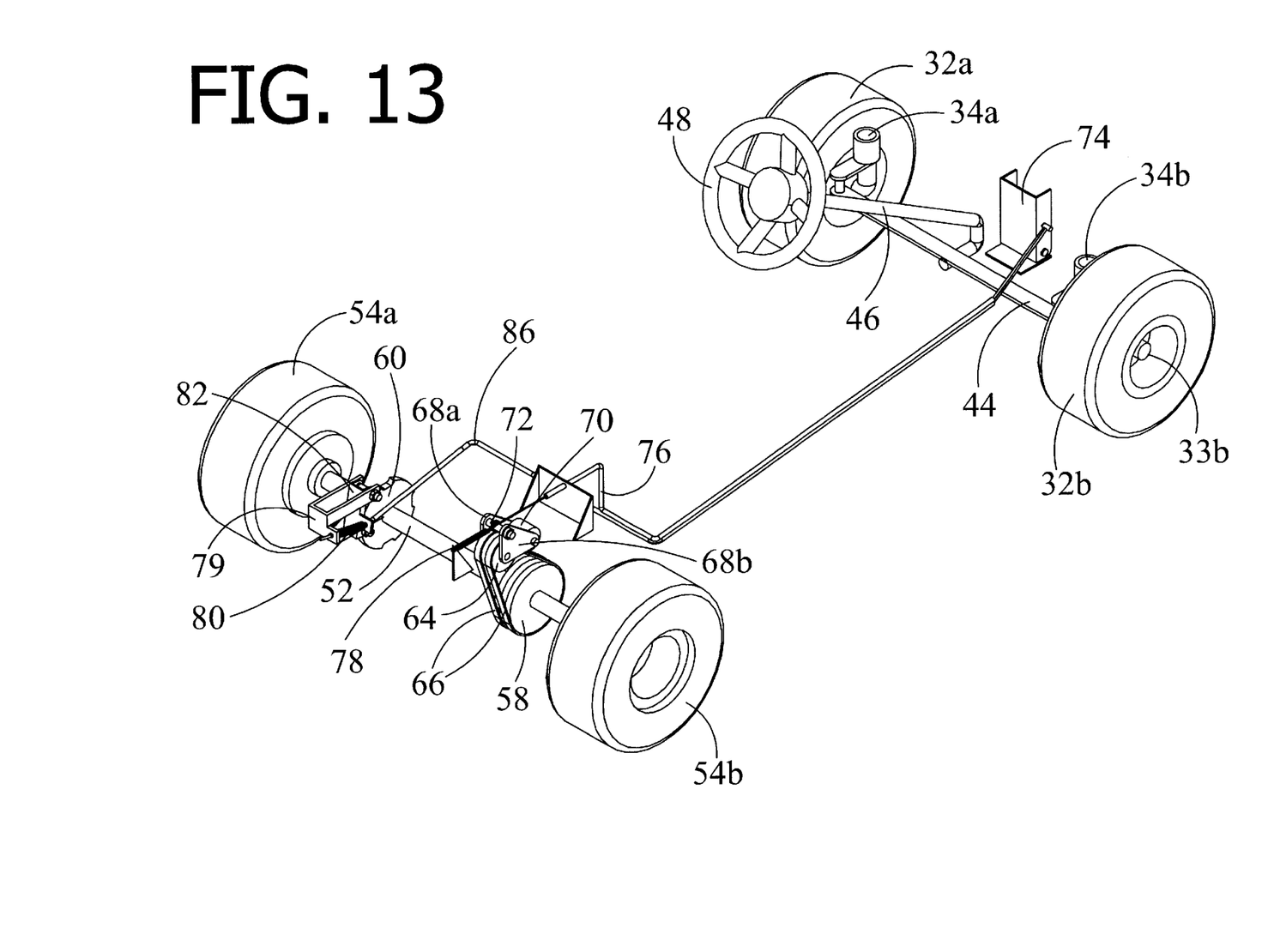
FIG. 13 is a rearward perspective view of a portion of the acceleration and braking ire assemblies of the go-kart assembly of the present invention.

Referring to FIGS. 9, 11b, and 11c, the go-kart assembly 10 of the present invention additionally includes a braking assembly that works in cooperation with the acceleration assembly to control the movement of the go-kart assembly 10. In addition to the brake hub 60 that is rigidly attached to the rear axle 52, the braking assembly also includes a housing bracket 79, a brake control line 86, a brake spring 80 surrounding said brake control line 86 and connected to the housing bracket 79, a brake arm 82 mounted within the housing bracket 79, and a brake pivot pin 84 (see ids FIGS. 11b, 12, and 13). The housing bracket 79 is preferably welded to the base section 14. The brake arm 82 has a first or proximal end 85a and a second or distal end 85b, with the first end 85a of the brake arm 82 pivotally connected to the housing bracket 79 by the brake pivot pin 84. The second end 85b of the brake arm 82 has a locking bolt 83 attached thereto. A brake control line 86 is connected between the control pedal 74 and the housing bracket 79, with the brake control line 86 passing through the brake arm 82. A brake control line covering 87 surrounds the brake control line 86 between the control pedal 74 and the brake arm 82. Finally, the brake spring 80, which is preferably a compression spring, is positioned around the brake control line 86 between the brake arm 82 and the body 12.

When the control pedal 74 is in the resting position and not being depressed by an operator, the go-kart assembly 10 will be motionless, and the brake spring 80 will push the brake arm 82 toward the brake hub 60. The position of the brake hub 60 will cause the locking bolt 83 to be pivoted to engage the brake hub 60. The locking bolt 83 will either be positioned between the teeth of the brake hub 60 or in a recess of the brake hub 60, such that the locking bolt 83 will prevent any rotation of the brake hub 60, and hence prevent rotation of the rear axle 52 as well. However, when the operator depresses the control pedal 74 the brake control line covering 87 will be forced in a direction toward the brake arm 82. The force of the brake control line covering 87 will overcome the force of the brake spring 80, thereby pivoting the brake arm 82 away from the brake hub 60. Consequently, the second end 85b of the brake arm 82 and the attached locking bolt 83 will pivot away from the brake hub 60, such that the locking bolt 83 will not prevent the rotation of the rear axle 52. The rear axle 52 will thereby be able to drive the go-kart assembly 10. When the operator releases the control pedal 74, the brake control line covering 87 will be drawn away from the brake arm 82 in a direction that the brake arm 82 will once again be drawn toward the brake hub 60 against the pressure of the brake spring 80. Consequently, the locking bolt 83 will once again engage the brake hub 60 between the teeth of the brake hub 60 or in a recess of the brake hub 60 to prevent any further rotation of the rear axle 52.

Referring back to FIGS. 1, 6, and 9, the go-kart assembly 10 additionally includes the protective cage assembly 90 as a safety measure for the operator. The protective cage assembly 90 includes a central frame member 92 that comprises and inverted U-shaped beam 94 and a distal connecting bar 96a and a proximal connecting bar 96b connected to the U-shaped beam 94. The protective cage assembly 90 additionally includes a distal and proximal front beam 98a, 98b and a distal and proximal rear beams 99a, 99b (preferably L-shaped beams). The protective cage assembly 90 is constructed by: joining one end of the distal connecting bar 96a with one end of the distal rear beam 99a; joining the opposite end of the distal connecting bar 96a with one end of the distal front beam 98a; joining one end of the proximal connecting bar 96b with one end of the proximal rear beam 99b; and joining the opposite end of the proximal connecting bar 96b with one end of the proximal front beam 98b.

Figure 6:
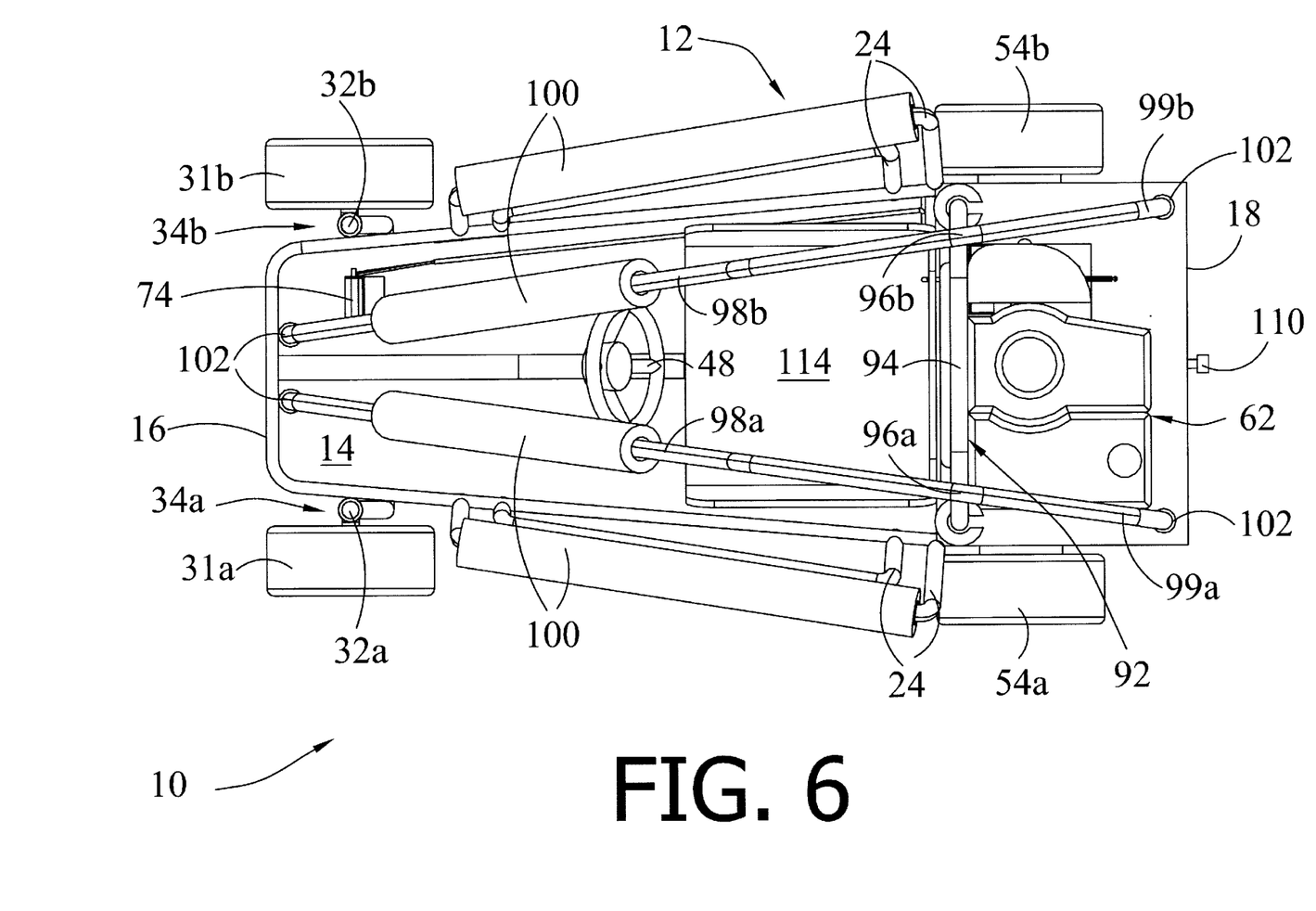
FIG. 6 is a top plan view of the improved go-kart assembly of the present invention.

A series of mounting cylinders 102 are further attached to the body 12 of the go-kart assembly 10. Once the individual members of the protective cage assembly 90 have been assembled, the protective cage assembly 90 can be joined with the body 12 using the mounting cylinders 102. Each end of the various components is inserted into a mounting cylinder 102 that has been rigidly attached to the body 12. As a result, the protective cage assembly 90 can be secured in the various mounting cylinders 102 using means commonly known in the art, such as screws or bolts. Additionally, a series of padding members 100 may be affixed to the various members of the protective cage assembly 90 as a safety measure for the operator of the go-kart assembly 10. Consequently, the operator sitting in a seat 114 and seat back 116 affixed to the body 12 will be guarded by the protective cage assembly 90.

Figure 5:
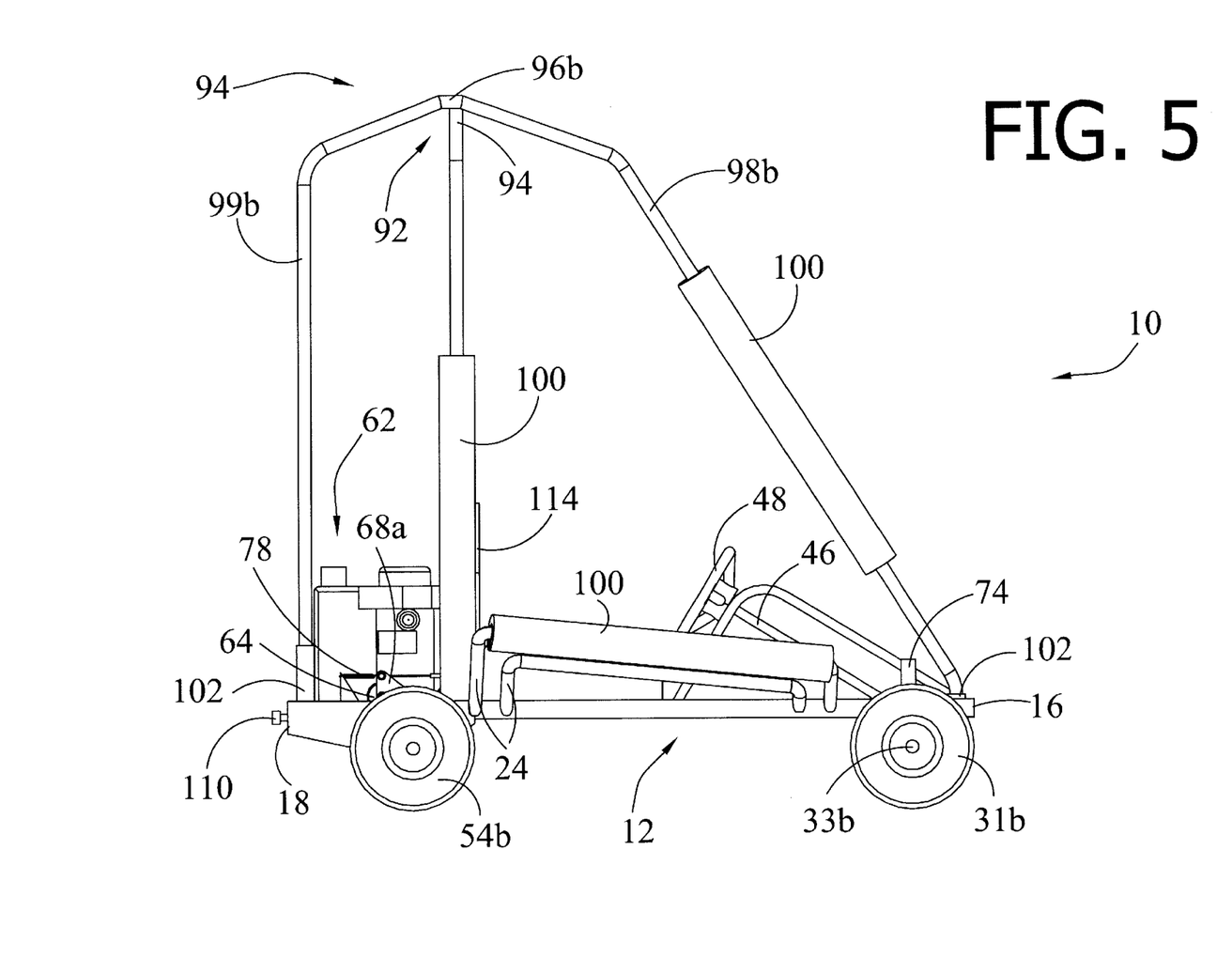
FIG. 5 is a right side view of the improved go-kart assembly of the present invention.

Finally, looking to FIGS. 5 and 9, this go-kart assembly 10 additionally includes an engine kill means 106 that will stop the operation of the motor 62 when activated. In the preferred embodiment, there are two kill switches that are connected to the motor 62: a toggle kill switch (not illustrated) positioned proximate the steering column 46 and a tether kill switch 110 positioned toward the rear of the go-kart assembly 10. Each switch 110 is connected to the motor 62 in a conventional manner such that activation of the switch 110 will stop operation of the motor 62. The toggle switch is in place for an operator to use, and simply allows the operator to turn the motor 62 off with a flip of the toggle lever. The tether kill switch 110 is connected to the rear edge 22 such that a tether cord 112 may be attached. This allows an observer to follow behind the go-kart assembly 10 and turn off the motor 62 by simply pulling the tether cord 112 from the tether kill switch 110.

It may be seen from the foregoing that the front drive assembly 30 and the rear drive assembly 50 are independent from each other, and the body 12 of the go-kart assembly 10 allows all four wheels 31a, 31b, 54a, and 54b, to remain in constant engagement with an underlying surface. This is correct even on uneven terrain such as might be encountered in a yard, wherein a preschooler operator would be expected to operate the go-kart assembly 10.

Additionally, it is clear from the foregoing that the various modular framework of the go-kart assembly 10 allows a user to easily construct and disassemble the go-kart assembly 10. The base section 14 (which is the largest component of the go-kart assembly 10) preferably has a width of approximately 24 inches and a length of almost 50 inches, with the remaining components of the go-kart assembly 10 being substantially small. Consequently, the size and modularity of the go-kart assembly 10 allows the user to contain the entire go-kart assembly 10 within a container having a height of 15 inches, a width of 25 inches, and a length of 50 inches, which is within the shipping-size limitations provided by major carriers. As a result, the design provides easy storage and conveyance of the go-kart assembly 10.

Thus, although there have been described particular embodiments of the present invention of a new and useful IMPROVED GO-KART DESIGN, it is not intended that such references be construed as limitations upon the scope of this invention except as set forth in the following claims.

What is claimed is:

1. An improved go-kart assembly comprising:
   a body having a forward end and a rearward end;
   a front drive assembly connected to said forward end of said body;
   a rear drive assembly connected to said rearward end of said body, said rear drive assembly including a rear axle rotatably connected to said body and a pair of driven wheels attached to opposing ends of said rear axle;
   an acceleration assembly connected to said body to rotate said rear axle and said driven wheels, said acceleration assembly including:
      an axle pulley attached to said rear axle;
      a motor attached to said body, said motor including a primary PTO shaft and an auxiliary PTO shaft with a drive pulley affixed to said auxiliary PTO shaft;
      at least one drive belt surrounding both said drive pulley and said axle pulley; and
   a control member joined with said acceleration assembly, said control member engaging said acceleration assembly to determine the operation of said acceleration assembly.

2. The go-kart assembly as described in claim 1 further comprising:
   a braking assembly to stop the rotation of said rear axle, said braking assembly connected to said body.

3. The go-kart assembly as described in claim 2 wherein said braking assembly comprises:
   a braking hub attached to said rear axle;
   a brake arm having a distal and a proximal end, said proximal end of said brake arm pivotally attached to said body proximate said braking hub;
   a locking bolt attached to said distal end of said brake arm such that said brake arm pivots to engage and disengage said locking bolt with said braking hub to control rotation of said braking hub.

4. The improved go-kart assembly as described in claim 3 wherein said braking hub includes an outer perimeter with a series of teeth attached to said perimeter.

5. The improved go-kart assembly as described in claim 3 wherein said braking hub includes an outer perimeter with a series of recesses about said perimeter.

6. The improved go-kart assembly as described in claim 1 further comprising a modular protective cage assembly attached to said body.

7. The improved go-kart assembly as described in claim 6 wherein said modular protective cage assembly comprises:
   a central frame member connected to said body;
   a pair of front beams connected between said central frame member and said forward end of said body; and
   a pair of rear beams connected between said central frame member and said rearward end of said body.

8. The improved go-kart assembly as described in claim 1 wherein said front drive assembly includes:
   a distal steerable wheel and proximal steerable wheel;
   a distal spindle member and proximal spindle member, said distal spindle member pivotally connecting said steerable wheel to said body and said proximal spindle member pivotally connecting said proximal steerable wheel to said body;
   a tie rod connecting said distal spindle member with said proximal spindle member; and
   a steering wheel assembly attached to said tie rod to direct the movement of said proximal steerable wheel and said distal steerable wheel.

9. An improved go-kart assembly comprising:
   a body having a forward end and a rearward end;
   a front drive assembly attached to said forward end of said body;
   a rear drive assembly attached to said rearward end of said body, said rear drive assembly including a rear axle rotatably connected to said body and a pair of driven wheels attached to opposing ends of said rear axle;
   an acceleration assembly connected to said body to rotate said rear axle and said driven wheels;
   a braking assembly connected to said body to stop the rotation of said rear axle, said braking assembly including a braking hub attached to said rear axle, a brake arm having a distal and a proximal end, said proximal end of said brake arm pivotally attached to said body proximate said braking hub; and a locking bolt attached to said distal end of said brake arm such that said brake arm pivots to engage and disengage said locking bolt with said braking hub to control rotation of said braking hub; and
   a control member joined with said acceleration assembly and said braking assembly, said control member determining the cooperative operation of said acceleration assembly and said braking assembly.

10. The go-kart assembly as described in claim 9 wherein said braking hub includes an outer perimeter and at least one flange attached to said outer perimeter.

11. The go-kart assembly as described in claim 9 wherein said acceleration assembly including:
   an axle pulley attached to said rear axle;
   a motor attached to said body, said motor including at least one drive shaft with a drive pulley affixed to said drive shaft; and at least one drive belt surrounding both said drive pulley and said axle pulley.

12. The improved go-kart assembly as described in claim 9 further comprising a modular protective cage assembly attached to said body.

13. The improved go-kart assembly as described in claim 12 wherein said modular protective cage assembly comprises:
- a central frame member connected to said body;
- a pair of front beams connected between said central frame member and said forward end of said body; and
- a pair of rear beams connected between said central frame member and said rearward end of said body.

14. The improved go-kart assembly as described in claim 9 wherein said front drive assembly includes:
- a distal steerable wheel and proximal steerable wheel;
- a distal spindle member and proximal spindle member, said distal spindle member pivotally connecting said steerable wheel to said body and said proximal spindle member pivotally connecting said proximal steerable wheel to said body;
- a tie rod connecting said distal spindle member with said proximal spindle member; and
- a steering wheel assembly attached to said tie rod to direct the movement of said proximal steerable wheel and said distal steerable wheel.

15. A modular go-kart that may be assembled and disassembled by a user, said modular go-kart comprising:
- a body having a forward end and a rearward end;
- a front drive assembly attached to said forward end of said body;
- a rear drive assembly attached to said rearward end of said body, said rear drive assembly including a rear axle rotatably connected to said body and a pair of driven wheels attached to opposing ends of said rear axle;
- a protective cage attached to the body, wherein said protective cage includes a central frame member, a pair of front beams, and a pair of rear beams that may be assembled; and
- a braking assembly including a braking hub attached to said rear axle, a brake arm having a distal and a proximal end, said proximal end of said brake arm pivotally attached to said body near said braking hub; and a locking bolt attached to said distal end of said brake arm such that said brake arm moves to engage and disengage said locking bolt with said braking hub to control rotation of said braking hub;

wherein said disassembled modular go-kart may be stored in a rectangular area having a height of not more than 15 inches, a width of not more than 25 inches, and a length of not more than 50 inches.

16. The modular go-kart as described in claim 15 wherein said braking hub includes an uneven outer perimeter.

17. The modular go-kart as described in claim 15 further comprising an acceleration assembly, said acceleration assembly including:
- an axle pulley attached to said rear axle;
- a motor attached to said body, said motor including at least one drive shaft with a drive pulley affixed to said drive shaft; and
- at least one drive belt surrounding both said drive pulley and said axle pulley.

18. The improved go-kart as described in claim 15 wherein said front drive assembly includes:
- a distal steerable wheel and proximal steerable wheel;
- a distal spindle member and proximal spindle member, said distal spindle member pivotally connecting said steerable wheel to said body and said proximal spindle member pivotally connecting said proximal steerable wheel to said body;
- a tie rod connecting said distal spindle member with said proximal spindle member; and a steering wheel assembly attached to said tie rod to direct the movement of said proximal steerable wheel and said distal steerable wheel.

* * * * *